United States Patent
Fukuda et al.

(10) Patent No.: US 8,040,776 B2
(45) Date of Patent: Oct. 18, 2011

(54) PULSE AMPLITUDE MODULATION CIRCUIT WITH PULSE WIDTH EQUALIZATION

(75) Inventors: Koji Fukuda, Fuchu (JP); Hidehiro Toyoda, Tachikawa (JP); Hiroki Yamashita, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1118 days.

(21) Appl. No.: 11/782,705

(22) Filed: Jul. 25, 2007

(65) Prior Publication Data

US 2008/0056342 A1 Mar. 6, 2008

(30) Foreign Application Priority Data

Sep. 6, 2006 (JP) .................. 2006-240941

(51) Int. Cl.
*G11B 7/0045* (2006.01)
(52) U.S. Cl. .................................. 369/59.11
(58) Field of Classification Search ....... 369/59.1–59.25
See application file for complete search history.

(56) References Cited

U.S. PATENT DOCUMENTS

| | | | | |
|---|---|---|---|---|
| 6,370,097 B1* | 4/2002 | Hayashi et al. | ............ | 369/59.11 |
| 2003/0142603 A1* | 7/2003 | Nakajo | ........................ | 369/53.2 |
| 2005/0058047 A1* | 3/2005 | Fujita et al. | ................ | 369/59.11 |
| 2005/0068060 A1 | 3/2005 | Ooshita et al. | | |
| 2005/0265184 A1* | 12/2005 | Sekiguchi et al. | ......... | 369/47.53 |
| 2006/0140097 A1* | 6/2006 | Tasaka et al. | ............... | 369/59.11 |

FOREIGN PATENT DOCUMENTS

| | | |
|---|---|---|
| JP | 11-259863 | 9/1999 |
| JP | 2005-057686 | 3/2005 |

* cited by examiner

*Primary Examiner* — Joseph Haley
*Assistant Examiner* — Nicholas Lee
(74) *Attorney, Agent, or Firm* — Antonelli, Terry, Stout & Kraus, LLP.

(57) ABSTRACT

In pulse width control equalization, attention is paid to the existence of the symmetry of anteroposterior signals and thereby the size of a table in which the adjustment amount of an edge position is stored is reduced to the power of one-half. Pattern jitters caused by inter-symbol interference are suppressed. The pulse time span of each symbol is adjusted to an optimum pulse width determined by a calculating formula or search in a table in response to a code sequence to be transmitted. In the configuration wherein a table is used, the table to store an edge position adjustment amount wherein the row of the exclusive OR of two symbols located at positions symmetrical to each other before and after a center symbol now ready to be sent in the code sequence is used as a search key is made.

2 Claims, 4 Drawing Sheets

PULSE AMPLITUDE MODULATION CIRCUIT WITH PULSE WIDTH EQUALIZATION

CLAIM OF PRIORITY

The present application claims priority from Japanese application JP 2006-240941 filed on Sep. 6, 2006, the content of which is hereby incorporated by reference into this application.

FIELD OF THE INVENTION

The present invention relates to a transmitter, in particular to a transmitter to control the transmission of signals.

BACKGROUND OF THE INVENTION

In recent years, in proportion to the rapid increase of the transmission speed of communication between LSIs or substrates, a serial transmission method for superimposing data on a clock in a signal line and transmitting the data is prevailing in place of a conventional parallel transmission method using a tandem clock. In the serial transmission method, it is necessary to dramatically increase the transmission speed per one signal line and, in association with that, the attenuation of the high frequency component of transmission signals caused by the skin effect of a transmission line conductor, the dielectric loss of an insulation material, or the like increases and, on the receiver side, deterioration of signal quality depending on a transmission code sequence called ISI (Inter-Symbol Interference) appears in an input waveform. As a result, an eye pattern on the receiver side narrows in both the time-axis (width) direction and the amplitude (height) direction and that causes a reception error to occur.

Figure 5A:
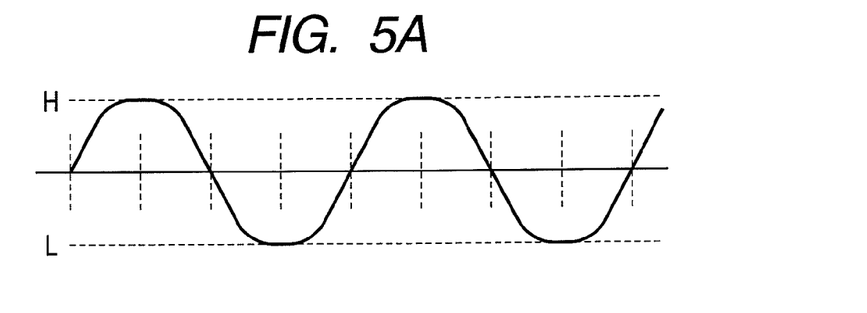
FIG. 5 comprises graphs conceptually showing that signal quality deteriorates by inter-symbol interference (ISI)
Figure 5B:
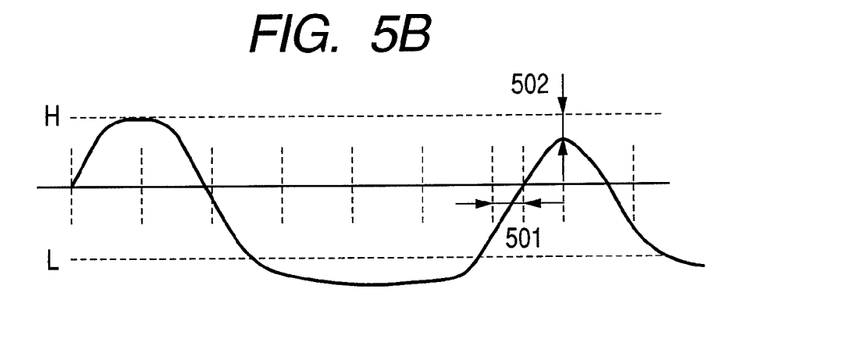

FIG. 5 comprises graphs conceptually showing that signals deteriorate by ISI. As shown in FIG. 5A, when a code sequence is a pattern wherein "H" levels and "L" levels appear alternately, both the time and the amplitude of a received signal are well aligned. As shown in FIG. 5B however, in a code sequence wherein an "H" level code appears after two "L" level codes appear consecutively, the deviation of received signals in the time-axis direction, namely pattern jitters, appears and also an amplitude may not reach a prescribed level in some cases. The deviation in the time-axis direction (pattern jitters) 501 and the deviation in the amplitude direction 502 appear as the reduction of the width and the height of an eye pattern on the receiver side, respectively.

The reduction of the height of an eye pattern, namely the deviation in the amplitude direction, can be compensated to some extent by amplifying signals with an amplifier. However, there is no means for simply compensating the reduction of the width of an eye pattern, namely pattern jitters, because it is impossible to extend the time axis. In addition, although to take out a clock from a signal waveform itself with a clock data regenerator (CDR) is generally employed in a recent serial transmission method, the jitters of received signals: largely deteriorate the performance of the clock data regenerator; and cause a reception error caused by synchronization deviation to appear. Therefore, how to suppress or compensate pattern jitters on a receiver side is a big problem in the event of high speed signal transmission.

In order to solve the problem, employed is a method for expanding an eye at a receiving end by transmitting a waveform distorted beforehand from a sender side (sender side equalization) in consideration of the ISI of a transmission line. As methods for the sender side equalization, there are roughly two methods; a method of changing a pulse amplitude in accordance with a code sequence to be sent (sender side pulse amplitude equalization) and a method of changing a pulse time span in accordance with a code sequence to be sent (sender side pulse width equalization).

The sender side pulse amplitude equalization: can determine the variation of amplitude by linear computation (an FIR filter) of a transmission data sequence; hence can be realized comparatively easily; and is widely used currently. In the sender side pulse amplitude equalization however, the equalization is carried out at each symbol and hence the ISI faster than a symbol rate cannot be compensated in principle, and consequently the effect of ISI reduction is limited.

In contrast, in the case of the sender side pulse width equalization, in principle it is possible to reduce pattern jitters to zero by optimally controlling the variation of a pulse width. Further, it is possible: to increase the average level of a transmission waveform to the limit of the capability of a transmitter; and hence to increase also the height of an eye pattern on the receiver side.

Figure 2:
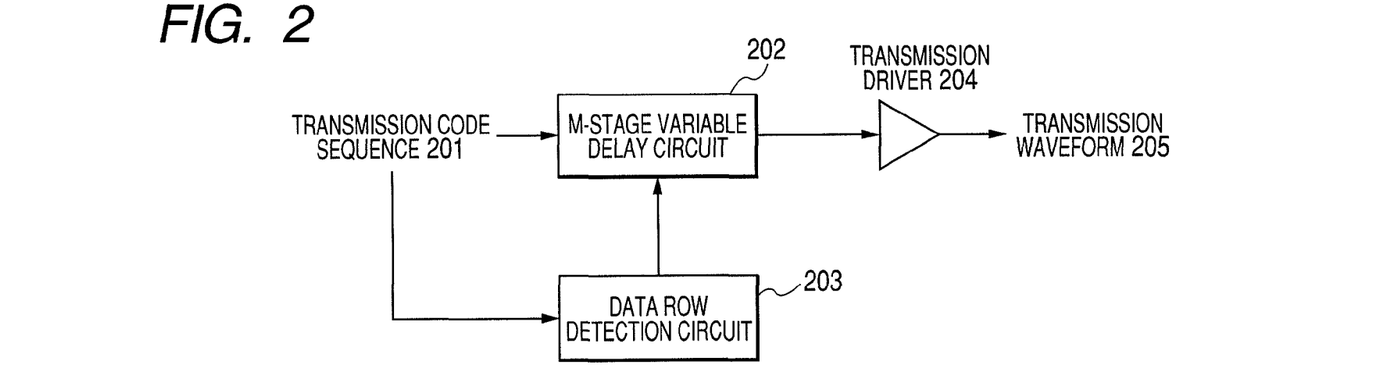
FIG. 2 is a block diagram showing an example of a known pulse width equalization circuit.

As an example of applying the sender side pulse width equalization to communication between LSIs, there is a transmission signal correction circuit disclosed in JP-A No. 2005-057686. FIG. 2 is a block diagram showing a transmission signal correction circuit disclosed in JP-A No. 2005-057686. In FIG. 2, a data row inspection circuit 203: inspects a code sequence 201 sent from an internal circuit to be sent outside; and determines an optimum pulse width. An M-stage variable delay circuit 202 delays the code sequence sent from the internal circuit on the basis of the pulse width, and then a transmission driver circuit 204 amplifies signals to a transmission level and outputs the signals.

In the transmission signal correction circuit of this configuration, the internal signals are delayed and output so as to: compensate pattern jitters beforehand on the receiver side; and get the optimum pulse width determined by some method in accordance with the transmission code sequence. As a result, the influence of pattern jitters is negated and a beautiful observation waveform can be obtained on the receiver side.

A big problem in the sender side pulse width equalization is that an optimum pulse width responding to a code sequence is hardly determined since the transmission code sequence and the optimum pulse width are in a complicated nonlinear relation. As a method for solving the problem, it is considered to make a table to store an optimum pulse width wherein a transmission code sequence is used as a search key in advance of actual transmission.

In a digital signal write/read device such as an optical disk or a magnetic disk for example, carried out are the processes of: writing a plurality of specific code sequences on trial in advance of actual data writing; and deciding and storing in a table an optimum pulse width responding to a code sequence from the observation result of the edge positions of the reproduced signals.

Figures 3, 4:
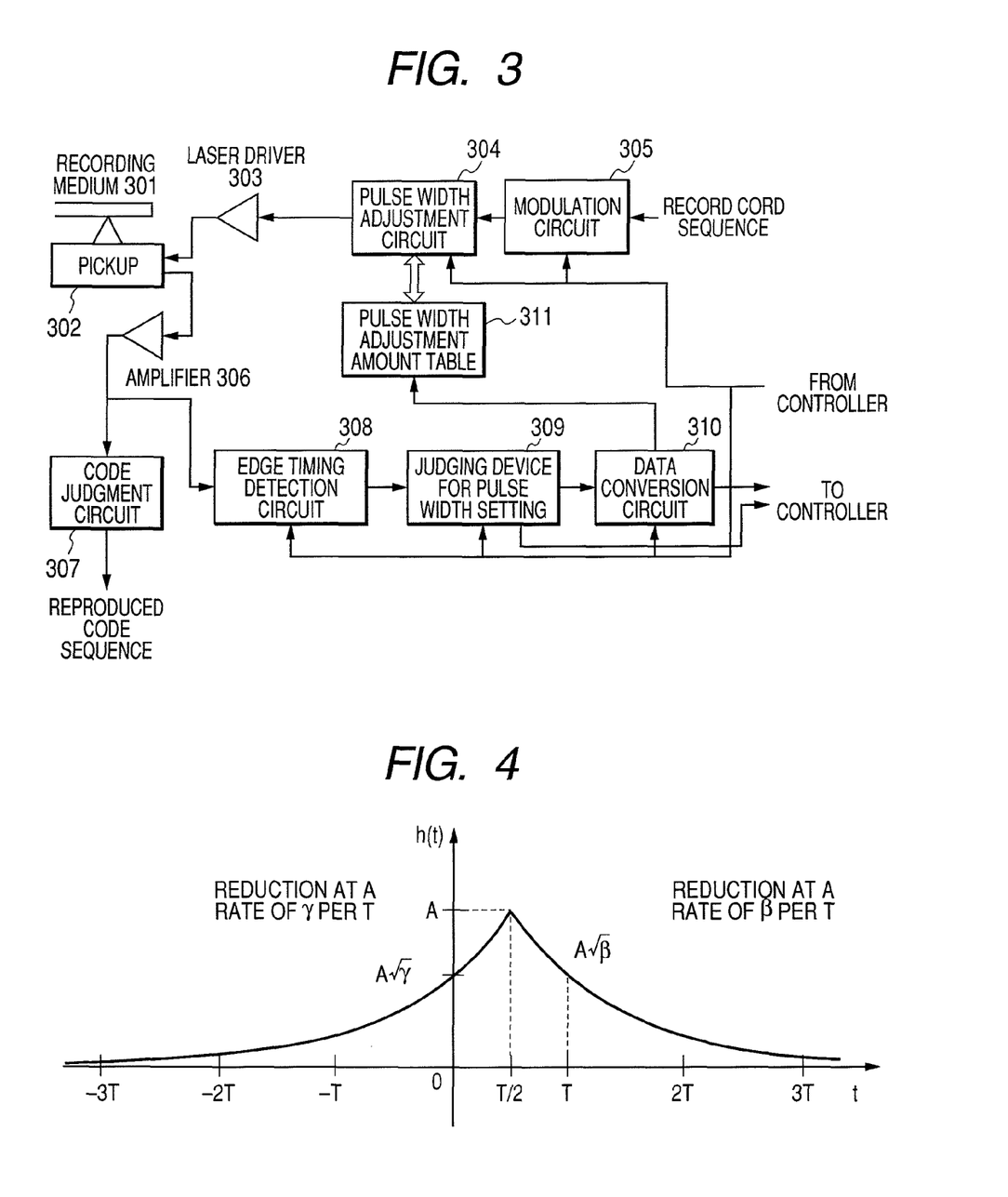
FIG. 3 is a block diagram showing a known optical disk write/read device wherein a pulse width is variable.
FIG. 4 is a graph showing a pulse response waveform exponentially reducing in a transmission line.

FIG. 3 is a simplified block diagram showing an optical disk memory unit disclosed in JP-A No. 11(1999)-259863. Every time when a recording medium 301 is exchanged, a plurality of specific code sequences are written on trial in the region for trial writing on the recording medium in advance of the start of the writing of actual data. On this occasion, a controller stops a pulse width adjustment circuit 305 and the pulse width of writing is kept constant. After the finish of the trial writing, the data written on trial are read with a pickup 302 and amplified with an amplifier 306, and the edge position of the data is detected with an edge timing detector 308. The magnitude of the deviation of the edge position of the data written on trial from its proper position is judged with a judging device for pulse width setting, a pulse width adjustment amount required for moving the edge position to its proper position is computed with a data conversion circuit 310, and the computed result is set in a pulse width adjustment amount table. The above processes are those carried out in advance of the writing of actual data every time when a recording medium is changed.

When actual data are written, the pulse width adjustment amount table 311 is looked up by using a code sequence to be written as a search key and an optimum pulse width is decided. After a pulse time span is adjusted so as to be the optimum pulse width with the pulse width adjustment circuit 304, the data are written into the recording medium 301 through a laser driver 303 and the pickup 302.

With an optical disk memory unit disclosed in JP-A No. 11(1999)-259863, it is possible to obtain a beautiful waveform having fewer jitters at reading by determining an optimum pulse width adjustment amount in response to a code sequence by trial writing every time when a recording medium is changed.

Here, estimated is the size of a table required for realizing such a configuration of storing an optimum pulse width responding to a code sequence in the table as the optical disk memory unit disclosed in JP-A No. 11(1999)-259863. ISI decreases as the distance from a target symbol increases. Therefore, in the event of equalization, only the code sequence of the length N that cannot ignore the influence of ISI may be taken into consideration. Here, N is a constant determined by the state of a line and the sensitivity of a receiver. In the optical disk memory unit disclosed in JP-A No. 11(1999)-259863, it is necessary to store an optimum pulse width in a table for each of the code sequences of the length N. Consequently, a table size proportional to 2 to the N-th power is necessary.

SUMMARY OF THE INVENTION

An optimum pulse width is in complicated nonlinear relation with a transmission code sequence and hence a means for effectively deciding the variation of the optimum pulse width from the transmission code sequence is necessary. In JP-A No. 11(1999)-259863 however, a concrete method for deciding the variation of an optimum pulse width in a case other than the case of a very small amount of specific code sequences such as consecutive "H" or "L" levels is not elaborated.

In a digital signal write/read device disclosed in JP-A No. 11(1999)-259863, an optimum pulse width adjustment amount is recorded on a table in response to a binary code sequence. Consequently, when ISI of a transmission line ranges to a code of the length N, a table the size of which is proportional to 2 to the N-th power is required. Therefore, when the ISI of a transmission line is large, a very large table is required. A digital signal write/read device has only one transmission line in the whole system and hence the size of a table has not been a problem. However, in transmission between LSIs wherein the transmission speed is raised generally by installing a large number of transmission lines in parallel, the reduction of a table size is a challenge in actual mounting.

Further, in a digital signal write/read device disclosed in JP-A No. 11(1999) -259863, it is necessary to write on trial (carry out training) in order to decide a pulse width adjustment amount in advance of the record of actual data. Consequently, it is necessary to keep a part of a recording medium as the region for the writing on trial and the storable capacity of actual data decreases by just that much. In communication between LSIs too, as the number of parallel transmission lines increases, the increase of the training time comes to a problem. Consequently, the simplification of training procedure is a challenge.

In a pulse amplitude modulation circuit according to a typical embodiment of the present invention, sender side pulse width equalization is carried out by: providing a table to store each pulse width adjustment amount in response to the row of the exclusive OR of codes located at positions symmetrical to each other before and after a center code now ready to be sent; and referring to the table and obtaining an adjustment amount by using the row of the exclusive OR of symbols located at positions symmetrical to each other before and after a center symbol now ready to be sent with regard to a code sequence to be actually sent as a search key.

Let's assume that a symbol row $a_k$ (k=. . . −2, −1, 0, 1, 2) is transmitted to a transmission line where inter-symbol interference (ISI) exists by binary pulse amplitude modulation (PAM2). Also it is assumed that the pulse waveform g(t) of one symbol having a symbol cycle T transmitted from a transmitter is observed as a pulse response function h(t) at a receiver by loss in the transmission line. Here, T is a constant and the pulse width is constant about all the symbols. Assuming that the transmission line is linear, when a symbol row $a_k$ ($a_k$=−1, 1) is sent and received in the transmission system, the observed waveform at the receiver is expressed with the following equation:

$$y(t) = \sum_{k=-\infty}^{\infty} a_k h(t - kT) \qquad \text{Equation 2}$$

When it is assumed that code transition exists between a symbol $a_{-1}$ and a symbol $A_0$ ($a_{-1} \neq a_0$), pattern jitters at the transition are expressed with the following equation:

$$y(t_J) = \sum_{k=-\infty}^{\infty} a_k h(t_J - kT) \qquad \text{Equation 3}$$

Here, $t_J$ satisfies the expression $-T/2 < t_J < T/2$. When the above equation is approximated one time with t=0 by the Newton-Raphson method, the following equation is obtained:

$$t_J = -\frac{\sum_{k=-\infty}^{\infty} a_k h(-kT)}{\sum_{k=-\infty}^{\infty} a_k h'(-kT)} \qquad \text{Equation 4}$$

Here, h'(t) represents the time differential of h(t).

It is assumed that the pulse response function of a transmission line decreases exponentially at a rate of β (0<β<1) on the backside and a rate of γ (0<γ<1) on the front side as apart from the center by one symbol. That is, the pulse response function is expressed as follows as shown in FIG. 4.

$$h(t) = \begin{cases} A\gamma^{(\frac{1}{2}-\frac{t}{T})} & \text{when } t \le T/2 \\ A\beta^{(\frac{t}{T}-\frac{1}{2})} & \text{when } t \ge T/2 \end{cases} \qquad \text{Equation 5}$$

When Equation 5 is substituted for Equation 4, the following equation is obtained:

$$t_J = T \cdot \frac{\sum_{k=0}^{\infty} a_{-(k+1)}\beta^k + \sum_{k=0}^{\infty} a_k \gamma^k}{\log(1/\beta)\sum_{k=0}^{\infty} a_k \beta^k - \log(1/\gamma)\sum_{k=0}^{\infty} a_{-(k+1)}\gamma^k} \quad \text{Equation 6}$$

Further, when it is assumed that the pulse response function is symmetrical with regard to t=T/2, namely β=γ, the following equation is obtained:

$$t_J = \frac{T}{\log(1/\beta)} \cdot \frac{\sum_{k=0}^{\infty}(a_k + a_{-(k+1)})\beta^k}{\sum_{k=0}^{\infty}(a_k - a_{-(k+1)})\beta^k} \quad \text{Equation 7}$$

$$= \frac{T}{\log(1/\beta)} \cdot \frac{\sum_{k=1}^{\infty}(a_k + a_{-(k+1)})\beta^k}{\sum_{k=0}^{\infty}(a_k - a_{-(k+1)})\beta^k}$$

Here, $a_{-1} \neq a_0$ is used.

Because of $|a_k|=1$ and $0<\beta<1$, the absolute value of Equation 7 is dominated by the influence of the numerator. Therefore, the absolute value of the pattern jitters $t_J$ is determined only by the row of the exclusive OR of the symbols ($a_{-(k+1)}$ and $a_k$) located at the positions symmetrical to each other before and after the target symbol $a_0$. On the other hand, when Equation 7 is subjected to Maclaurin's expansion regarding β and $a_k = -1, 1$ is taken into consideration, it is understood that, when the numerator of Equation 7 is large, namely when the symmetry of the symbol row is destroyed and large pattern jitters occur, the code of Equation 7 is determined by the product $a_{-1}a_{-2}$. That is, pattern jitters occur so that the edge may be forwarded in the case of $a_{-1} \neq a_{-2}$ and so that the edge may be delayed in the case of $a_{-1} = a_{-2}$.

From the above result, it is possible to: store a pulse width adjustment amount to negate pattern jitters in a table wherein the row of the exclusive OR of symbols located at positions symmetrical to each other before and after a center target symbol in a code sequence to be sent is used as a key; and carry out sender side pulse width equalization by looking up the table. On this occasion, the direction of the pulse width adjustment is determined with two symbols before the target symbol.

Further, a pulse amplitude modulation circuit according to another embodiment of the present invention: directly computes an edge position adjustment amount to negate pattern jitters $t_J$ at the edge position on the receiver side expressed by Equation 6 from the parameters β and γ of the pulse response function showing the state of a transmission line; and decides the edge position of the transmission signal, instead of the use of a table wherein the edge position adjustment amount responding to the exclusive OR of symbols located at positions symmetrical to each other before and after a center target symbol (the symbol now ready to be transmitted) in a code sequence is stored. That is, an edge position adjustment circuit that computes the edge position adjustment amount $t_E$ from the given parameters β and γ of a transmission line by the following equation and outputs the result is used.

$$t_E = K \cdot \frac{\sum_{k=0}^{\infty} a_{-(k+1)}\beta^k + \sum_{k=0}^{\infty} a_k \gamma^k}{\log(1/\gamma)\sum_{k=0}^{\infty} a_{-(k+1)}\gamma^k - \log(1/\beta)\sum_{k=0}^{\infty} a_k \beta^k} \quad \text{Equation 1}$$

The present invention makes it possible to dramatically reduce the size of a table that stores an edge position adjustment amount to negate pattern jitters for the pattern of each code sequence to be transmitted. Thereby, it is possible to reduce the circuit size on the sender side required for suppressing pattern jitters on the receiver side to a desired accuracy. Further, it is also possible to drastically reduce the labor for the training of the circuit.

In reality however, the pulse response of a transmission line does not have perfect anteroposterior symmetry and it is uncertain that the pulse response reduces precisely exponentially. Strictly speaking therefore, if an edge position adjustment amount is written by the above method, equalization error increases in comparison with the case of simply making a whole code sequence as a key. However, if the equalization error is smaller than the scale of an adjustable pulse width, the penalty caused by the adoption of the above method does not become obvious.

Furthermore, if a configuration wherein an edge position adjustment amount is directly computed from a parameter representing the state of a transmission line is employed, it is possible to decide an optimum edge position adjustment amount to a transmitted code sequence without the training of a circuit. In transmission between LSIs, the state of a transmission line is determined mainly by a transmission distance and hence it is possible to transmit a code sequence at an adequate pulse width from the beginning without training as long as the transmission distance is given.

The present invention can be used for all the devices each of which: belongs to a data transmission circuit using a communication interface and a high-speed serial interface; and has a data transmission route in a communication interface and a device including a network device (a router and a switch, a transmission device, a media converter, a repeater, a gateway, or the like), a personal computer, a server, a large computer, a disk array system, a network attached storage (NAS), or the like.

DETAILED DESCRIPTION OF THE PREFERRED EMBODIMENTS

Embodiments according to the present invention are hereunder explained in detail in reference to drawings. Note that, the present invention is not limited by the following embodiments.

First Embodiment

Figure 1:
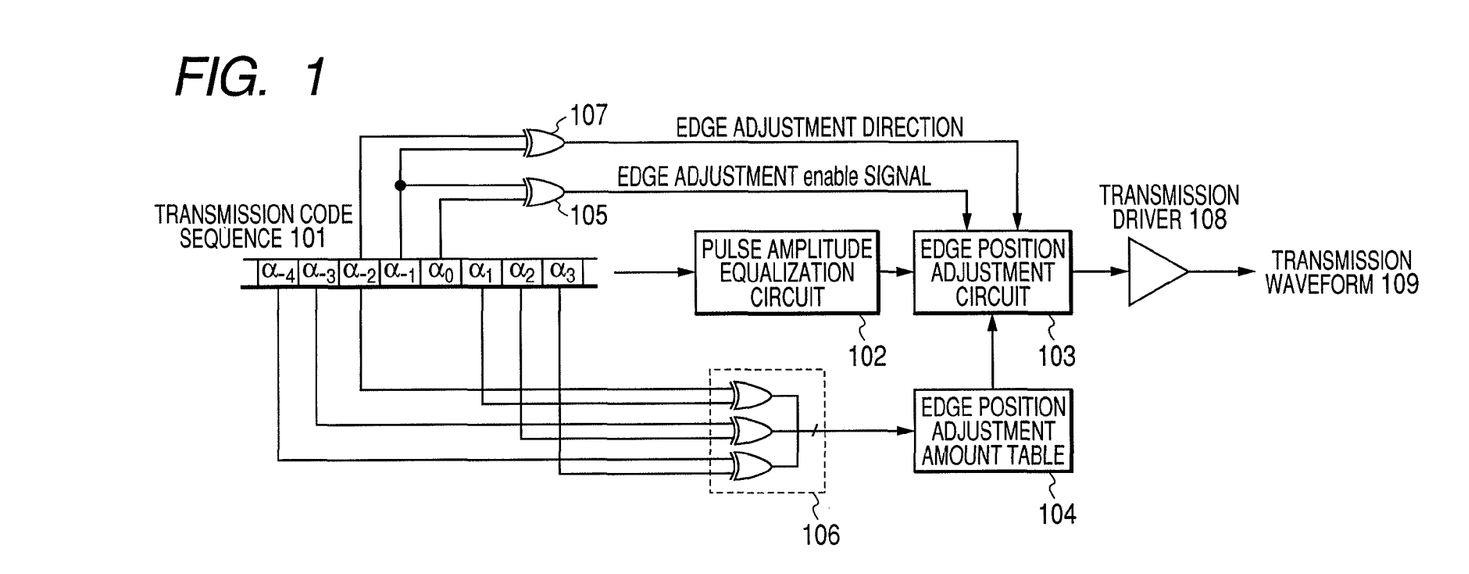
FIG. 1 is a view showing an example of a configuration of an edge position adjustment amount table in a pulse amplitude modulation circuit according to the present invention.

FIG. 1 is a view showing a configuration of a first embodiment of a pulse amplitude modulation circuit according to the present invention. In FIG. 1, the pulse amplitude modulation circuit includes: a pulse amplitude equalization circuit 102; an edge position adjustment circuit 103; an edge position adjustment amount table 104 to store an optimum pulse width wherein the exclusive OR of symbols located at positions symmetrical to each other before and after a symbol now ready to be transmitted is used as a search key; an exclusive OR circuit 105 to detect the existence of code transition before the present target symbol; an exclusive OR circuit group 106 to compute the exclusive OR of symbols located at positions symmetrical to each other before and after the present target symbol; an exclusive OR circuit 107 to compute an edge position adjustment direction by computing the exclusive OR of two symbols before the present target symbol; and a transmission driver 108. In FIG. 1, a transmission code sequence 101 represents a binary code sequence . . . $a_{-3}$, $a_{-2}$, $a_{-1}$, $a_0$, $a_1$, $a_2$, $a_3$ . . . ($a_k$=+1 or −1) that is sent from an internal circuit to be sent outside. Here, ao represents the symbol now ready to be transmitted.

Prior to actual transmission, the edge position adjustment amount table 104 is set at an optimum value by some sort of method. For example, in an initialization procedure prior to actual data transmission, such kind of a method can be considered as: for fixing an edge position, transmitting a plurality of known code sequences, and measuring the edge position at a receiver; or for transmitting a plurality of known code sequences while changing an edge position and recording the edge position where an eye opening at a receiver is the maximum. Further, if a substrate material, a line length, and others are known and a parameter representing the state of a transmission line can be estimated, it is also possible to make an edge position adjustment amount table 104 with a computation circuit shown in after-mentioned Second embodiment. Otherwise, if transmission and reception are carried out through a fixed transmission line every time, a configuration wherein an optimum edge position adjustment amount is stored in an edge position adjustment amount table 104 with hard-wiring or a ROM at the time of circuit design is also possible.

In actual transmission, the code sequence 101 sent from an internal circuit to be sent outside is: equalized in the amplitude direction with the pulse amplitude equalization circuit 102; and input into the edge position adjustment circuit 103. As the pulse amplitude equalization circuit 102, a known circuit such as a general equalization circuit with an FIR filter can be used. Here, a configuration wherein the pulse amplitude equalization circuit 102 is not used and the transmission code sequence 101 is directly input into the edge position adjustment circuit 103 without pulse amplitude equalization is also possible. Otherwise, a configuration wherein the order of the pulse amplitude equalization circuit 101 and the edge position adjustment circuit 103 is reversed and the pulse amplitude equalization is applied after the pulse width equalization is applied in advance is also possible.

In the meantime, the exclusive OR circuit group 106 computes the exclusive OR row of symbols located at positions symmetrical to each other before and after the symbol ao now ready to be transmitted. Here, in FIG. 1, the exclusive OR circuit group 106 comprises three exclusive OR circuits to compute the exclusive OR row of three pairs of symbols before and after the symbol ao now ready to be transmitted but it is also possible to select an appropriate number, other than three, of the pairs of the symbols: located at positions symmetrical to each other before and after the symbol ao; and used for the computation of the exclusive OR in consideration of the magnitude of ISI in a transmission line, the span of an edge position adjustable with the edge position adjustment circuit 103, and others. The edge position adjustment amount table 104: uses the exclusive OR row of the symbols located at positions symmetrical to each other before and after the symbol ao now ready to be transmitted and computed with the exclusive OR circuit group 106 as a search key; looks up the optimum edge position of the edge immediately before the symbol $a_0$; and inputs the result into the edge position adjustment circuit 103.

The exclusive OR circuit 105: actuates the edge position adjustment circuit 103 when an edge exists immediately before the symbol ao now ready to be transmitted, namely in the case of $a_{-1} \neq a_0$; and, in contrast, stops the edge position adjustment circuit 103 and directly inputs the output from the pulse amplitude equalization circuit 102 into the transmission driver 108 when an edge does not exist immediately before the symbol $a_0$, namely in the case of $a_{-1} = a_0$. Here, considering that the edge position adjustment circuit 103 does nothing when an edge does not exist, a configuration wherein the exclusive OR circuit 105 is omitted and the edge position adjustment circuit 103 is always kept in the state of being actuated regardless of the existence or the nonexistence of an edge is also possible.

The exclusive OR circuit 107 decides the direction of edge position adjustment by computing the exclusive OR of two symbols $a_{-1}$ and $a_{-2}$ immediately before the symbol $a_0$ now ready to be transmitted. That is, the edge position adjustment circuit 103 changes the edge position: so as to be delayed in the case of $a_{-1} \neq a_{-2}$; and so as to be forwarded in the case of $a_{-1} = a_{-2}$. Here, considering that the exclusive OR of $a_{-2}$ and $a_0$ is input into the edge position adjustment amount table 104, a configuration wherein the exclusive OR circuit 107 computes not the exclusive OR of the symbols $a_{-1}$ and $a_{-2}$ but the exclusive OR of the symbols a0 and $a_{-1}$ is also possible.

The edge position adjustment circuit 103 adjusts the position of the edge of a signal output from the pulse amplitude equalization circuit 101 to the extent shown by the edge position adjustment amount table 104 in the direction computed with the exclusive OR circuit 107. The transmission driver 108 amplifies a signal output from the edge position adjustment circuit 103 to a transmission level and sends the signal to exterior as a transmission waveform 109.

The pulse amplitude modulation circuit according to the present embodiment adjusts to an optimum position and outputs the edge immediately before the symbol a0 now ready to be transmitted in a binary code sequence . . . $a_{-3}$, $a_{-2}$, $a_{-1}$, $a_0$, $a_1$, $a_2$, $a_3$ . . . sent from an internal circuit to be sent outside in consideration of the code sequence before and after $a_0$. By so doing, pattern jitters reduce at a receiver end and the reliability of signal transmission improves.

Second Embodiment

Figure 6:
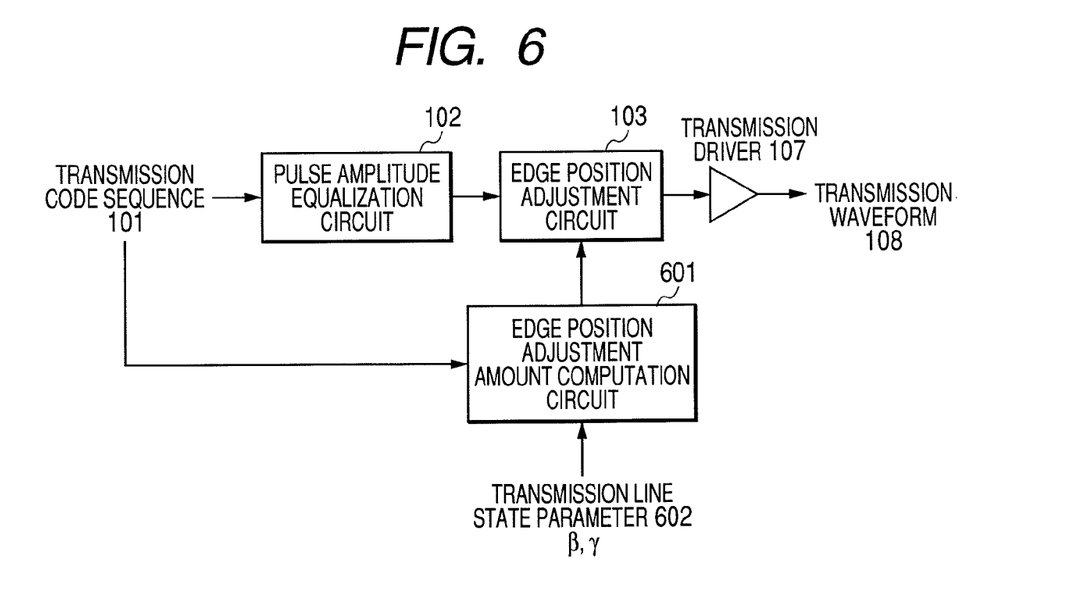
FIG. 6 is a block diagram showing an example of a pulse amplitude modulation circuit according to the present invention.

FIG. 6 is a block diagram showing a configuration of a second embodiment of a pulse amplitude modulation circuit according to the present invention. The pulse amplitude modulation circuit includes: a pulse amplitude equalization circuit 502; an edge position adjustment circuit 103; an edge position adjustment amount computation circuit 601; and a transmission driver 107.

Prior to actual data transmission, it is necessary to decide the parameters β and γ (refer to FIG. 4 and Equation 6) representing the state of a transmission line. The state of a transmission line is determined almost by the material quality of a substrate and the length of a line and hence, if it is possible to know the state of the transmission line by some sort of method, it is possible to decide β and γ by looking up a table. In actual application, the material quality of a substrate is known from the beginning in most cases. Meanwhile, the length of a line can be measured by a known method such as the measurement of the feedback time of a reflected wave. Otherwise, if transmission and reception are carried out through a fixed transmission line every time, a configuration wherein the parameters β and γ representing the state of a transmission line are produced with hard-wiring at the time of circuit design is also possible.

In actual data transmission, a code sequence 101 sent from an internal circuit to be sent outside is: equalized in the amplitude direction with the pulse amplitude equalization circuit 102; and input into the edge position adjustment circuit 103. As the pulse amplitude equalization circuit 102, a known circuit such as a general equalization circuit with an FIR filter can be used. Here, a configuration wherein the pulse amplitude equalization circuit 102 is not used and the transmission code sequence 101 is directly input into the edge position adjustment circuit 103 without pulse amplitude equalization is also possible. Otherwise, a configuration wherein the order of the pulse amplitude equalization circuit 101 and the edge position adjustment circuit 103 is reversed and the pulse amplitude equalization is applied after the pulse width equalization is applied in advance is also possible. Meanwhile, the edge position computation circuit 601: computes an edge position adjustment amount $t_E$ that negates pattern jitters $t_J$ represented by Equation 6 at an edge on a receiver side from the parameters β and γ representing the state of a transmission line with the following equation; and outputs the result.

$$t_E = K \cdot \frac{\sum_{k=0}^{\infty} a_{-(k+1)} \beta^k + \sum_{k=0}^{\infty} a_k \gamma^k}{\log(1/\gamma) \sum_{k=0}^{\infty} a_{-(k+1)} \gamma^k - \log(1/\beta) \sum_{k=0}^{\infty} a_k \beta^k} \quad \text{Equation 1}$$

The edge position adjustment circuit 103: adjusts the edge position of a signal output from the pulse amplitude equalization circuit 102 in accordance with the output tE of the edge position adjustment amount computation circuit 601; and outputs the signal. The transmission driver 107: amplifies the signal output from the edge position adjustment circuit 103 to a transmission level; and sends the signal as a transmission waveform 108 to exterior.

Figure 7:
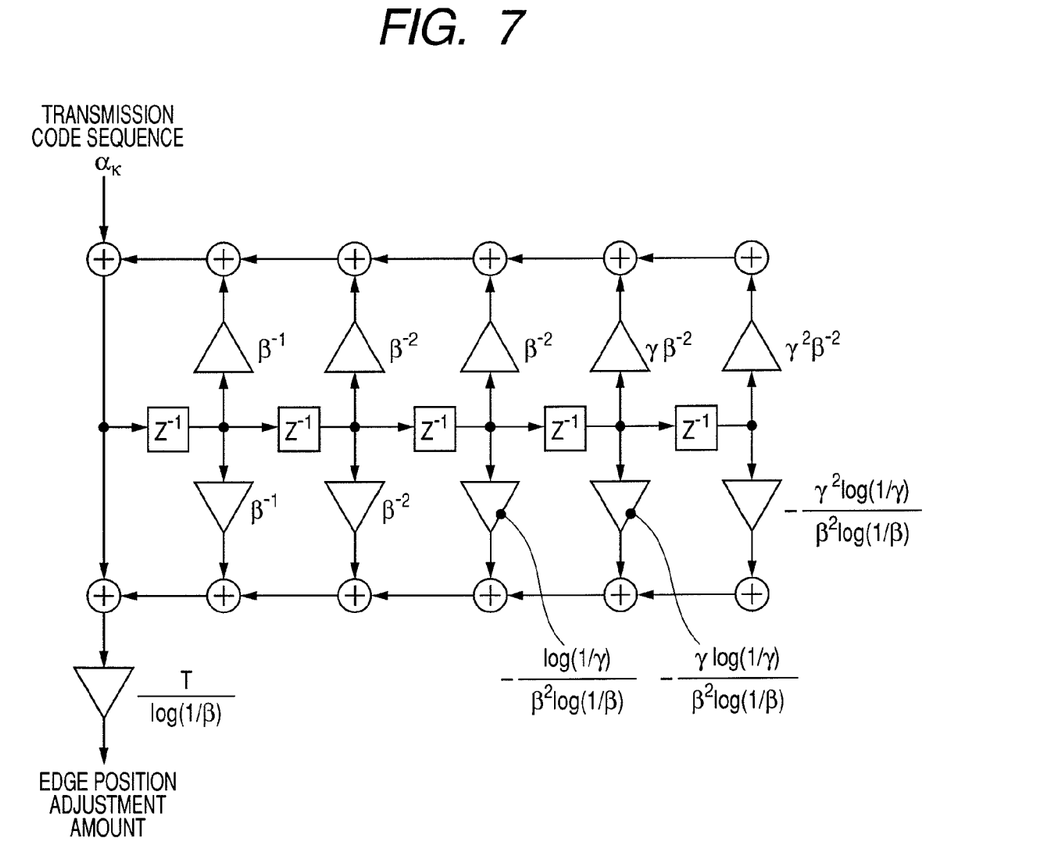
FIG. 7 is a view showing an example of an edge position adjustment amount computation circuit.

Equation 1 that computes an edge position adjustment amount contains division and hence a novel idea is required for installing a circuit of high efficiency. As an example, in FIG. 7, shown is a circuit to compute Equation 6 with an IIR filter in the case where only the influence of three pairs of symbols before and after the symbol $a_0$ now ready to be transmitted, namely six symbols $a_{-3}, a_{-2}, a_{-1}, a_0, a_1, a_2$, is taken into consideration. In FIG. 7, a block $Z^{-1}$ represents a hold circuit of one symbol time T, a triangle a gain (constant multiplication), and + an addition. The following expression is obtained by applying z conversion to the transfer function of an IIR filter shown in FIG. 7:

$$-T \cdot \frac{\beta^2 + \beta z^{-1} + z^{-2} + z^{-3} + \gamma z^{-4} + \gamma^2 z^{-5}}{\log(1/\beta) \cdot (\beta^2 + \beta z^{-1} + z^{-2}) - \log(1/\gamma) \cdot (z^{-3} + \gamma z^{-4} + \gamma^2 z^{-5})} \quad \text{Equation 8}$$

It is understood that the filter outputs the value obtained by computing Equation 1 with regard to the three pairs of symbols before and after the symbol $a_0$ now ready to be transmitted, namely six symbols $a_{-3}, a_{-2}, a_{-1}, a_0, a_1, a_2$. A configuration wherein the number of the symbols to be considered is set at a number other than six is also possible in consideration of the magnitude of ISI in a transmission line, the span of an edge position adjustable with the edge position adjustment circuit 103, and others. Further, the number of the symbols to be considered is not necessarily identical between the numbers thereof before and after the symbol $a_0$ now ready to be transmitted and a configuration wherein four symbols are before the symbol $a_0$ and one symbol is after the symbol $a_0$, namely $a_{-4}, a_{-3}, a_{-2}, a_{-1}, a_0$, is also possible.

As stated above, embodiments wherein an edge position computation circuit to compute an edge position adjustment amount so as to negate pattern jitters represented by Equation 6 at the edge position on a receiver side is employed are explained. Instead of this, it is also possible to modify the configuration of an edge position computation circuit so as to compensate the pattern jitter amount at the edge position on the receiver side that is approximated on the premise that the pulse response function is symmetrical with respect to t=T/2 as shown by Equation 7. Thereby the circuit configuration is further simplified.

What is claimed is:

1. A pulse amplitude modulation circuit to apply pulse amplitude modulation to a code sequence and output it, comprising:
   an edge position adjustment amount computation circuit to decide an optimum edge position adjustment amount from a binary code sequence sent from an internal circuit to be sent outside; and
   an edge position adjustment circuit to adjust the edge position of a transmission signal on the basis of an output from the edge position adjustment amount computation circuit,
   wherein the edge position adjustment amount computation circuit includes a table that stores an edge position adjustment amount wherein a row of the exclusive OR of two symbols located at positions symmetrical to each other before and after a center symbol now ready to be sent in the code sequence is used as a search key.

2. A pulse amplitude modulation circuit to apply pulse amplitude modulation to a code sequence and output it, comprising:
   a first exclusive OR circuit to detect whether transition exists or not before a symbol now ready to be sent in a binary code sequence sent from an internal circuit to be sent outside;
   an exclusive OR circuit group to compute the exclusive OR of symbols located at positions symmetrical to each other before and after the symbol ready to be sent in the binary code sequence;
   a table to store each edge position adjustment amount in response to the row of the exclusive OR of symbols located at positions symmetrical to each other before and after the symbol ready to be sent in the binary code sequence and to look up the edge position adjustment amount by inputting the output from the exclusive OR circuit group as a search key; and an edge position adjustment circuit to decide the transition of a transmission signal by the output from the first exclusive OR circuit and to control the edge position of the transmission signal in accordance with the edge position adjustment amount looked up from the table.

* * * * *